June 25, 1935.   N. A. TORNBLOM   2,006,090
EXPLOSIONPROOF CABLE CONNECTER
Filed Feb. 7, 1935
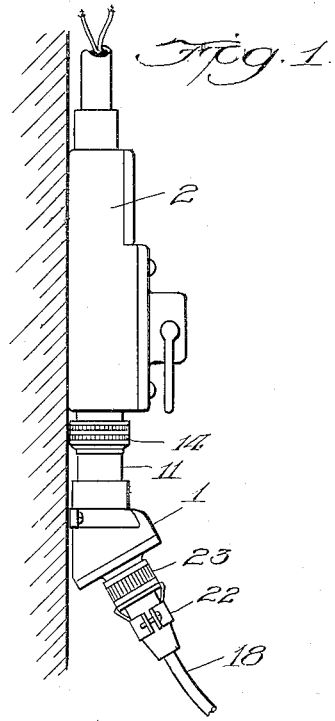
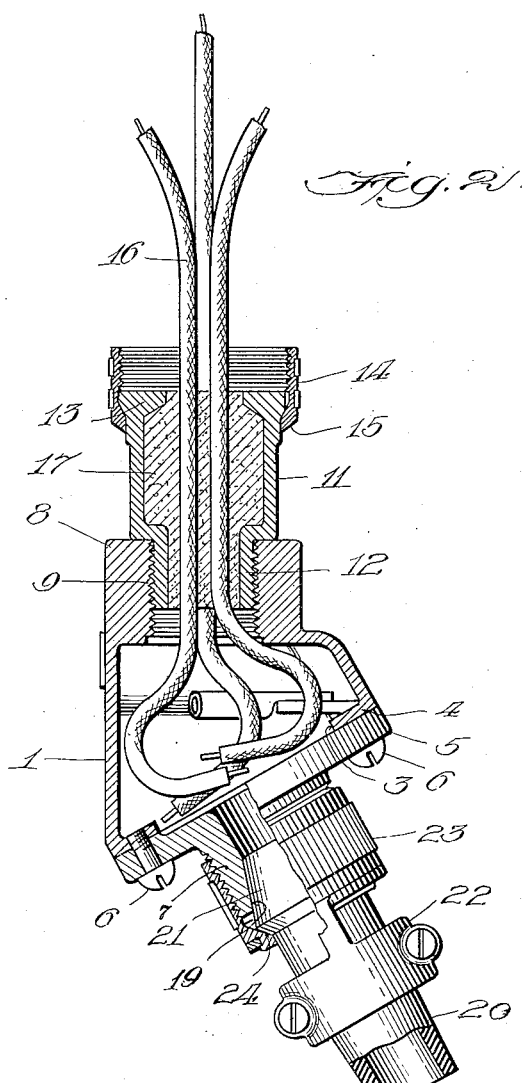
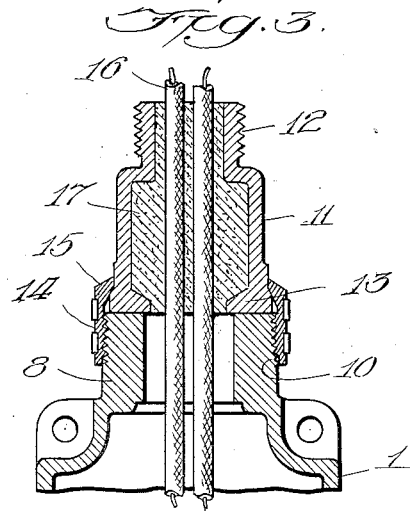
Inventor:
Nils A. Tornblom,
by Wm. F. Freudenreich, atty.

Patented June 25, 1935

2,006,090

UNITED STATES PATENT OFFICE 2,006,090

EXPLOSIONPROOF CABLE CONNECTER

Nils A. Tornblom, Chicago, Ill., assignor to Appleton Electric Company, a corporation of Illinois Application February 7, 1935, Serial No. 5,501

5 Claims. (Cl. 247—18)

Power circuits for machinery in shops and other places where there may be present gases capable of being ignited by an electric spark are required to be housed in protective pipes. However, it sometimes happens that because of the manner in which a machine must be moved or manipulated the current must be carried to it through a rubber-covered cable.

The object of the present invention is to produce a simple and novel device for connecting such a cable, as aforesaid, to a switch box in such a manner that the absence of a protective pipe for the conductors leading from the switch box to the machine to be energized does not cause any danger of igniting surrounding combustible gases upon the opening of the switch.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is an elevation showing a switch box coupled to a cable by means of one of my improved devices; Fig. 2 is a central longitudinal section through the device, on a larger scale than Fig. 1; and Fig. 3 is a view similar to Fig. 2, showing only a fragment of the device, slightly modified.

Referring to the drawing, I represents a hollow casing the chamber in which is large enough to contain the splices between the conductors of a cable and lead-in wires to a switch box 2. This casing has a large opening 3 in a wall 4 thereof, and a cover 5 for such opening. The wall 5 illustrated is circular in shape and the opening 3, also circular, is in the center. Thus there is left a wide annular surface or face surrounding the opening and insuring a tight joint between the wall and the cover when the cover, which is of the same diameter as the wall, is fastened on. The cover is conveniently secured by screws 6. The casing also has two hubs or nipples, 7 and 8. In the arrangement shown, the nipple 7 is on and forms part of the cover. The hub or nipple 8 is either internally screw-threaded, as indicated at 9 in Fig. 2, or is externally threaded as at 10 in Fig. 3.

Cooperating with the hub or nipple 8 is a coupling sleeve 11. One end 12 of this sleeve is reduced in diameter and is externally screw-threaded to fit the screw threads 9 or similar screw threads in a hub on a switch box. The sleeve is enlarged at the other end to produce at the extreme end an external annular rib or flange 13. Surrounding the sleeve is a sleeve nut 14, internally screw-threaded to fit a threaded part, such as the hub 8 in Fig. 3 or a similar externally threaded hub or nipple on a switch box. The part 14 has an internal diameter great enough to allow it to slip over the enlargement 13, except that at its inner end it has an inturned annular lip 15 that lies behind and is adapted to engage with the inner or rear edge of the enlargement. Thus the sleeve 11 may be used interchangeably with switch boxes or the like having inlet or outlet elements of different styles. Extending lengthwise through the sleeve 11, and protruding therefrom at each end, are short wires 16. These wires are fixed in the sleeve by sealing cement 17 which fills the interior of the sleeve. The chamber within the sleeve is preferably smaller in diameter at the ends than in the middle so that the hard block of cement, after it has set, is positively interlocked with the sleeve and held against withdrawal through either end of the sleeve.

It will be seen that when the sleeve is connected to the switch box and also to the splicing casing, one set of ends of the short wires extend into the box and may there be connected to the line wires; the other set of wire ends being arranged in the splicing casing where they are spliced to the wires in the flexible cable 18. The sealing medium positively shuts off communication between the interior of the switch box and the interior of the splicing casing, so that neither flame nor gases can escape from the switch box into the splicing casing. In other words, the connection between the splicing casing and the switch box may be said to be explosion-proof.

The cable is secured to the splicing casing at the nipple or hub 7 and the cable or, at least the conductors therein, enters the casing through this hub or nipple. In the arrangement shown, the hub or nipple 7 is externally screw-threaded and has a frusto-conical or flaring bore 19 of which the smallest diameter is at the inner end. There is a soft rubber sleeve 20 having a frusto-conical head 21, at one end, serving as a plug or stopper for the bore 19. The sleeve 20 is arranged within a combined clamp and coupling, comprising a contractile clamp device 22 coaxial with and fixed to one end of a sleeve nut 23 that is adapted to be screwed upon the nipple 7. At the inner end of the nut, that is, the end next to the clamp, there is an internal annular lip or flange 24 adapted to engage the inner or rear end face of the head on the rubber sleeve and force the head tightly into the nipple 7 when the nut is screwed on the nipple. A fluid-tight joint is thus produced between the cable, which the rubber sleeve surrounds, and the splicing casing. By tightening the clamp on the body of the sleeve, the cable is gripped and held so that the joint between the rubber sleeve and the casing is relieved of the pulling stresses to which the cable may be subjected during use of the cable.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A device for making an explosion-proof connection between a cable and a switch box or the like, comprising a casing, means to connect a cable to the casing with its conductors extending into and terminating within the casing, a coupling sleeve adapted at one end to be connected to the casing and at the other end to said box, short wires within and extending through the sleeve, said wires projecting beyond the ends of the sleeve into the casing and the box, respectively, and a sealing medium in the sleeve around the wires and forming an effective barrier to the passage of fluids or flame between the box and the casing.

2. A device for making an explosion-proof connection between a cable and a switch box or the like, comprising a casing having a screw-threaded nipple and a flat wall with a large opening therethrough, a detachable cover for said opening fitting against said flat wall, a coupling sleeve having one end adapted to be joined to said box, and the other end adapted to engage said nipple, short wires extending through and protruding from both ends of the sleeve so as to extend at one end into said box and at the other end into the interior of said casing, a sealing medium within said sleeve, means to secure an end of a cable to said cover and permit the conductors therein to extend through the cover into the casing.

3. A device for making an explosion-proof connection between a cable and a switch box or the like, comprising a casing containing a splicing chamber and having a detachable cover and two nipples one of which is carried by the cover, a coupling sleeve adapted at one end to engage with one of said nipples and adapted at the other end for connection to said box, short conductors extending through said sleeve and protruding from both ends thereof so as to enter both the box and said splicing chamber when the parts are assembled, a sealing medium in the sleeve around the conductors therein forming an effective barrier to the passage of fluids or flame through the sleeve, and means connecting the cable to the second of said nipples with its conductors projecting into said splicing chamber.

4. A device for making an explosion-proof connection between a cable and a switch box or the like, comprising a casing containing a splicing chamber and having a detachable cover and two nipples one of which is carried by the cover, the casing and the cover having wide areas in contact with each other, a coupling sleeve adapted at one end to engage with one of said nipples and adapted at the other end for connection to said box, short conductors extending through said sleeve and protruding from both ends thereof so as to enter both the box and said splicing chamber when the parts are assembled, a sealing medium in the sleeve around the conductors therein forming an effective barrier to the passage of fluids or flame through the sleeve, and means connecting the cable to the second of said nipples with its conductors projecting into said splicing chamber.

5. A device for making an explosion-proof connection between a cable and a switch box or the like, comprising a casing, means to connect a cable to the casing with its conductor extending into the same, a coupling sleeve connecting the casing and the box together, said sleeve having at one end an externally screw-threaded part and having at its other end a loose sleeve nut to adapt either end to be coupled to the box, depending upon whether the box is provided with an externally or an internally threaded hub, short wires extending through and protruding from both ends of the sleeve into the box and the casing, respectively, and a sealing medium filling the sleeve.

NILS A. TORNBLOM.